(12) United States Patent
Rink, Jr. et al.

(10) Patent No.: US 6,369,482 B1
(45) Date of Patent: Apr. 9, 2002

(54) GENERATOR ARMATURE BAR SUPPORT SYSTEM AND RELATED METHOD

(75) Inventors: Frederick John Rink, Jr., Clifton Park; Robert John Nygard, Saratoga Springs, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/671,828

(22) Filed: Sep. 27, 2000

(51) Int. Cl.[7] .................................................. H02K 3/34
(52) U.S. Cl. ........................ 310/215; 310/214; 310/202; 29/606
(58) Field of Search ................................ 310/215, 214, 310/201, 202, 203; 29/596, 598, 734, 732, 736, 606, 605

(56) References Cited

U.S. PATENT DOCUMENTS

| | | | | |
|---|---|---|---|---|
| 3,444,407 A | * | 5/1969 | Yates | ......................... 310/215 |
| 4,067,106 A | * | 1/1978 | Brown | ......................... 29/734 |
| 4,214,182 A | | 7/1980 | Keim | ......................... 310/216 |
| 4,345,175 A | * | 8/1982 | Jones | ......................... 310/45 |
| 5,341,561 A | * | 8/1994 | Schorm et al. | ................ 29/596 |
| 5,708,315 A | | 1/1998 | Gould et al. | ................. 310/180 |

* cited by examiner

Primary Examiner—Karl Tamai
Assistant Examiner—Thanh Lam
(74) Attorney, Agent, or Firm—Nixon & Vanderhye P.C.

(57) ABSTRACT

A generator armature bar support system includes in a temporary assembly state, an elongated armature bar having a bottom surface, a top surface and a pair of side walls. A spacer is then temporarily located on the top surface of the armature bar; and an elastomer stretched and wound about the armature bar and spacer along substantially the length of the armature bar. A method of supporting a generator armature bar in a radial slot of a stator core body is also disclosed and includes locating a spacer on a top surface of the armature bar; wrapping the armature bar and spacer with an elastomer having shape memory properties along substantially the length of the armature bar, while stretching the elastomer to thereby reduce its thickness; locating the armature bar in the radial slot of the stator core body such that the spacer is radially inward of the armature bar; tearing the elastomer along a line adjacent a radially inner surface of the spacer to thereby create a pair of free edges and to cause the elastomer to relax and fill any air space between the side walls of the radial slot and the side walls of the armature bar; and then removing the spacer.

10 Claims, 1 Drawing Sheet

GENERATOR ARMATURE BAR SUPPORT SYSTEM AND RELATED METHOD

This invention relates to an improved arrangement for securing armature bars in radially oriented slots in a stator core body.

BACKGROUND OF THE INVENTION

In large generators, armature bars typically comprise many copper strands wrapped with many layers of insulating tape and conducting armor, to thus provide a rigid, solid member with a hard outer surface. In certain stator designs, two such armature bars are secured in each of several radial slots in the stator core body, stacked one above the other, with fillers, top ripple springs to restrain the bars radially, and side ripple springs to increase friction between the bar and the slot side wall. The bars are held in place by wedges driven into longitudinal dovetail grooves formed near the top of each slot, along opposite side walls of the slot.

To accommodate the side ripple springs, ample slot side clearance is provided, but the result is undesirable dead air space between the bars and the slot walls.

In U.S. Pat. No. 5,708,315, a stretchable coil wrapper is disclosed for covering an armature on three sides with an elastomeric sheet. After the bar is covered on three sides (i.e., in a U-shape), the elastomer is stretched by a coil stretching device, thinning the elastomer and permitting the bar to be inserted into the radial slot. Then, after the bar is inserted into the slot, the device is removed so that the elastomer contracts, filling the spaces between the bar and the slot walls. Excess material is then trimmed to fit.

BRIEF SUMMARY OF THE INVENTION

In this invention, a different approach is taken in the use and manipulation of the elastomeric material as compared to the '315 patent. In the later, the generator is for hydroelectric use, and the armature bars are permanently captured once they are installed. The elastomer wrapping/stretching technique utilized there will not work in other generators that require the windings to be lifted near their opposite ends during final winding closeup.

Accordingly, the present invention makes use of a temporary spacer placed on the radially inward side of the bar. A release line or wire is taped on the radially inward surface of the spacer, and the elastomer is then spirally wound completely about the bar, spacer and release line, along substantially the entire length of the bar (i.e., at least along that portion of the bar received in the radial slot).

After the bottom bar is located in the stator slot (or after all of the bottom bars are located in all of the respective radial slots), the release line is pulled to tear the elastomer longitudinally along the bar, freeing the elastomer to retract into and fill the slot spaces on either side of the bar. The spacer and release line are then removed and the assembly process continues via the addition of fillers, the second armature bar (for which the elastomer process described above is repeated), more fillers and finally the end wedges.

With this invention, the ends of bars can be lifted as necessary, before the release line is pulled, so that the elastomer will remain stretched during any such lifting.

Another feature of the invention relates to the sizing of the spacer in the height direction so that when released, the cut edges of the elastomer will retract to points just below the top edges of the bar to thereby eliminate or at least minimize trimming. In other words, the height of the spacer is selected as a function of the elasticity of the elastomer to maximize process efficiency.

Accordingly, in one aspect, the present invention relates to a generator armature bar support system comprising, in a temporary assembly state; an elongated armature bar having a bottom surface, a top surface, and a pair of side walls; a spacer temporarily located on the top surface of the armature bar; and an elastomer stretched and wound about the armature bar and spacer along substantially the length of the armature bar.

In another aspect, the invention relates to a method of a method of supporting a generator armature bar in a radial slot of a stator core body comprising:

a) locating a spacer on a radially inner surface of the armature bar;

b) wrapping the armature bar and spacer with an elastomer having shape memory properties along substantially the length of the armature bar, while stretching the elastomer to thereby reduce its thickness;

c) locating the armature bar in the radial slot of the stator core body such that the spacer is radially inward of the armature bar;

d) tearing the elastomer along a line adjacent a radially inner surface of the spacer to thereby cause the elastomer to relax and fill any air space between side walls of the radial slot and side walls of the armature bar; and e) removing the spacer.

DETAILED DESCRIPTION OF THE INVENTION

Figure 1:
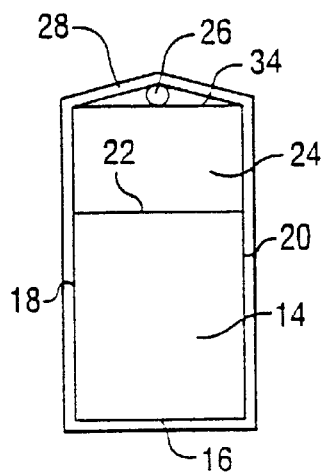
FIG. 1 is a schematic diagram of an armature bar encased in a stretched elastomer, with a temporary spacer and release wire inside the wrap.
Figure 2:
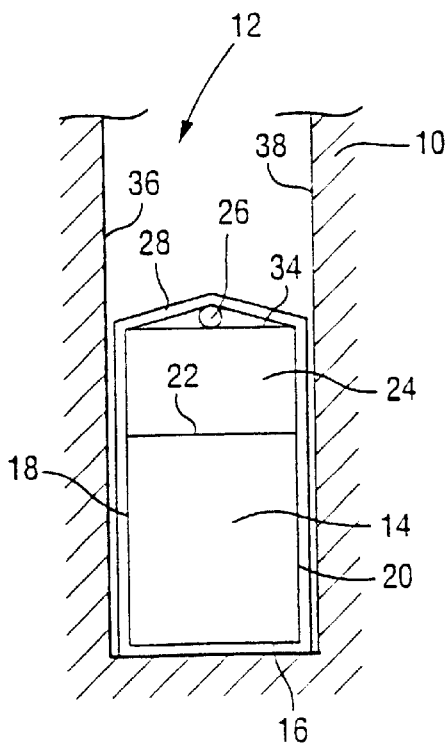
FIG. 2 is a diagram illustrating the armature bar of FIG. 1 located in a radial slot of a stator core body.

With reference to FIGS. 1 and 2, a stator core body 10 is formed with a plurality of radial slots 12 (one shown), with an armature bar 14 located in the bottom of the slot. For purposes of this discussion, the slot 12 may be assumed to be at the 6 o'clock position in the stator core. Accordingly, any reference to a "top" or "upper" surface or the like may also be characterized as referring to a radially inner or inward surface or the like. The armature bar has a bottom or radially outer surface 16, a pair of side walls 18, 20 and a top or radially inner surface 22.

A relatively rigid spacer 24 is located on the top surface 22 of the bar 14, and extends substantially the entire length thereof, or at least the length of the radial slot 12. A release line or wire 26 is taped on top of the spacer, and also extends substantially the entire length of the slot. The bar 14, spacer 24 and release wire 26 are collectively wrapped in spiral wound fashion with a stretched elastomer 28, along substantially its entire length. Stretching of the elastomer results in a thinning of the material, so that the overall cross-sectional profile of the wrapped bar in this temporary assembly state is smaller than it would be if the stretched elastomer were in a normal relaxed condition.

After the wrapped bar 14 is located in the bottom of the slot 12, the release wire 26 is pulled from one end of the bar toward the other, tearing the stretched elastomer and creating a pair of free edges 30, 32 along a tear line that is substantially centered on the top surface 34 of the spacer 24, and parallel to the longitudinal axis of the bar 14. By tearing the elastomer, the latter is released such that it will retract in opposite directions from the tear line, filling the spaces between the side walls 18, 20 of the wrapped bar and the side walls 36, 38 of the slot. In this manner, the air spaces between the bar and the slot side walls are eliminated.

Figure 3:
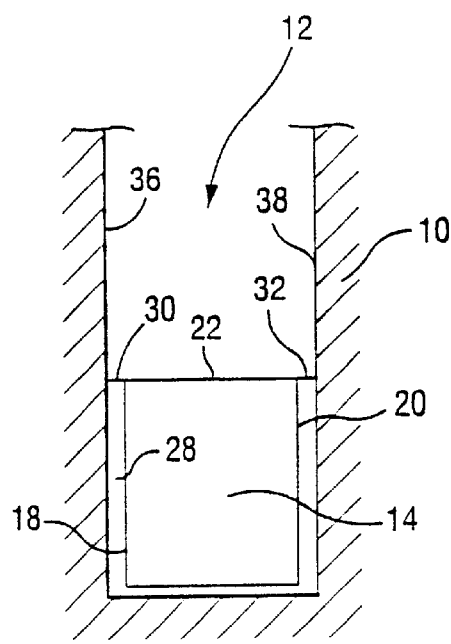
FIG. 3 is a schematic diagram of the armature bar in FIG. 1 after the release line and spacer have been removed, and the elastomer retracted to its normal unstretched state, filling the space between the bar and the slot side walls.

By choosing the height of the spacer 24, thus determining the extent of the elastomer winding, the cut free edges 30, 32 of the elastomer will retract to a location flush with or just below the top surface 22 of the bar 14 (see FIG. 3), minimizing if not completely eliminating the need for any subsequent trimming. Note in this regard that the release wire 18 has negligible effect on the wound profile of the bar, and is exaggerated in size in the drawings merely for the sake of clarity.

Figure 4:
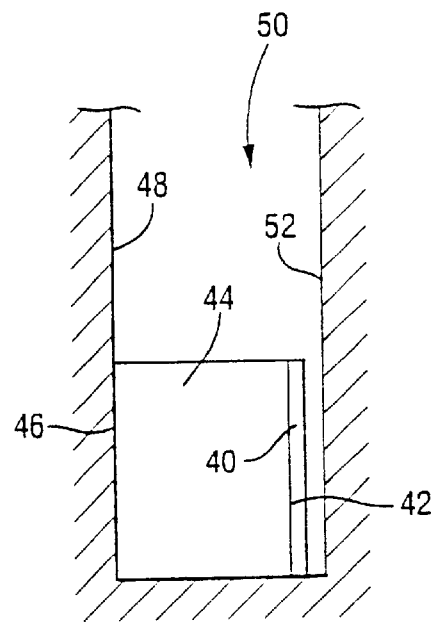
FIG. 4 is a schematic diagram of an armature bar and elastomer strip in a radial slot in accordance with another exemplary embodiment of the invention.

In a less preferred, alternative arrangement illustrated in FIG. 4, one or more elastomer strips 40 may be located along only one side wall 42 of an armature bar 44, stretched and secured at opposite ends thereof. In this arrangement, the other side wall 46 of the bar 44 is fully engaged with the respective side wall 48 of the slot 50. Once the bar is located in the slot 50, the ends of the elastomer strip (or strips) 40 are released, resulting in an axial contraction of the elastomer that fills any space between the bar and the opposite slot side wall 52.

As disclosed in the '315 patent, the elastomer may be any suitable temperature or chemically sized elastomer material that is stretchable but that has shape memory properties that seek to return the elastomer to its original thickness when relaxed. The elastomer may contain carbon, metallic or other inorganic particles to improve its heat and electrical conductivity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator armature bar support system comprising, in a temporary assembly state:

an elongated armature bar having a bottom surface, a top surface, and a pair of side walls;

a spacer temporarily located on the top surface of the armature bar; and an elastomer stretched and wound about the armature bar and spacer along substantially the length of the armature bar.

2. The generator armature bar support system of claim 1 wherein said elastomer has shape memory properties that tend to return the elastomer to its original thickness when in a relaxed state.

3. The generator armature bar support system of claim 1 wherein a release wire is located along a top surface of said spacer to thereby enable tearing of the elastomer along a tear line parallel to a longitudinal axis of said armature bar.

4. The generator armature bar support system of claim 3 wherein said release wire is centered on the top surface of said spacer.

5. The generator armature bar support system of claim 1 wherein said spacer has a height dimension chosen as a function of the elasticity of the elastomer.

6. A method of supporting a generator armature bar in a radial slot of a stator core body comprising:

a) locating a spacer on a radially inner surface of the armature bar;

b) wrapping the armature bar and spacer with an elastomer having shape memory properties along substantially the length of the armature bar, while stretching the elastomer to thereby reduce its thickness;

c) locating the armature bar in the radial slot of the stator core body such that the spacer is radially inward of the armature bar;

d) tearing the elastomer along a line adjacent a radially inner surface of the spacer to thereby create a pair of free edges and to cause said elastomer to relax and fill any air space between side walls of the radial slot and side walls of the armature bar; and e) removing said spacer.

7. The method of claim 6 wherein step d) is carried out utilizing a release wire located between a radially inner surface of said spacer and said elastomer.

8. The method of claim 7 wherein said release wire is centered on the radially inner surface of the spacer.

9. The method of claim 7 wherein said spacer has a height dimension chosen as a function of the elasticity of the elastomer.

10. The method of claim 6 wherein said spacer has a height dimension chosen as a function of the elasticity of the elastomer.

* * * * *